United States Patent [19]

Hicks

[11] 4,017,046
[45] Apr. 12, 1977

[54] SUPPORTING, ALIGNING AND COUPLING DEVICE FOR PIPES

[76] Inventor: Chester F. Hicks, 203 N. Main St., Walbridge, Ohio 43465

[22] Filed: Apr. 25, 1975

[21] Appl. No.: 571,544

[52] U.S. Cl. .................................. 248/55; 248/49
[51] Int. Cl.² ........................................ F16L 3/16
[58] Field of Search ..................... 248/55, 58, 49; 138/106; 308/DIG. 8, 3 C, 3 R

[56] References Cited

UNITED STATES PATENTS

| | | | |
|---|---|---|---|
| 429,041 | 5/1890 | Lynch | 138/106 |
| 932,743 | 8/1909 | Zinn | 138/106 X |
| 1,079,759 | 11/1913 | Gray | 248/55 |
| 3,026,076 | 3/1962 | Bender | 248/49 |
| 3,315,927 | 4/1967 | Malloy et al. | 248/55 |
| 3,349,418 | 10/1967 | Hein | 308/3 R X |
| 3,390,854 | 7/1968 | Sherburne | 248/55 |
| 3,436,129 | 4/1969 | James | 308/3 R |
| 3,472,474 | 10/1969 | Fountain et al. | 248/55 |
| 3,539,137 | 11/1970 | March | 248/58 X |
| 3,554,618 | 1/1971 | Ditzler et al. | 308/3 R |
| 3,774,983 | 11/1973 | Lagally | 308/DIG. 8 |
| 3,870,260 | 3/1975 | Swart | 248/55 X |

Primary Examiner—Roy D. Frazier
Assistant Examiner—Rodney H. Bonck
Attorney, Agent, or Firm—David H. Wilson

[57] ABSTRACT

A pipe saddle having a wear block adapted to engage a support surface with respect to which it is free to move. Glass fiber reinforced resin is employed as the outer surface of the saddle. A core is employed in the wear shoe to enable essentially uniform wall thicknesses of glass fiber reinforced resin to be maintained. Reduced frictional resistance to pipe motion relative to a supporting surface is achieved with a shoe insert having a low coefficient of friction relative to that surface on the bearing face of the wear block.

6 Claims, 5 Drawing Figures

SUPPORTING, ALIGNING AND COUPLING DEVICE FOR PIPES

BACKGROUND OF THE INVENTION

1. Field of the Invention

This invention relates to pipe supports and more particularly it relates to fiber reinforced resin pipe supports adapted to support a substantial length of fiber reinforced resin pipe.

2. Description of the Prior Art

Heretofore, it has been known to support pipe in cradles having a concave support surface generally conforming to a portion of the outer surface of the pipe. Such constructions have been formed with bases for support on suitable flat surfaces such as beams so that longitudinal displacement of the pipe with respect to the support surface is accommodated by a sliding action of the base on the support surface. In one such arrangement a wooden cradle having a flat bearing face has been employed. Frequently such pipe supporting structures are maintained in environments which due to the presence of moisture and/or corrosive materials cause rapid deterioration of the cradle. Fabricated metal structures are expensive to manufacture. Where plastic or glass fiber reinforced resin pipe is to be supported the dissimilarities in physical properties of the metal cradles and the pipe result in detrimental pipe wear.

An object of this invention is to improve pipe supports.

Another object is to facilitate manufacture of pipe supports having relatively long supporting surfaces which retain a shape conforming to the exterior of the pipe to be supported.

A third object is to increase the freedom of motion of pipe supports with respect to their supporting surfaces.

A fourth object is to provide a pipe cradle which can be utilized as a portion of a coupling between ends of pipe section.

DETAILED DESCRIPTION OF THE PREFERRED EMBODIMENTS

Figure 1:
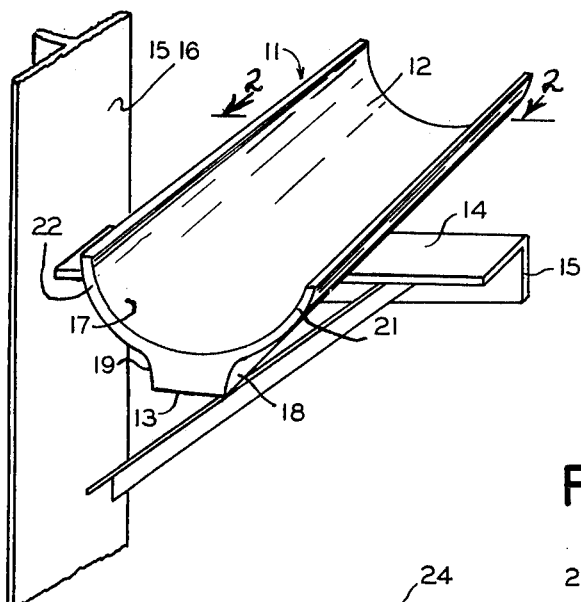
FIG. 1 is a perspective view of a pipe saddle according to this invention and a typical in plant support thereof.

The pipe saddle 11 of this invention comprises a right circular cylindrical segment 12 formimg a cradle on a wear pad 13. Advantageously, the length of the cradle and wear pad are of the same magnitude as the pipe diameter for large diameter pipes and at least twice the length of the bearing surface 14 on which the wear pad is supported. This length in excess of the bearing surface 14 is significant where longitudinal shifting of the pipe and its saddle is to be anticipated as where an angle iron brace 15 is extended horizontally with one flange functioning as a bearing surface 14.

A typical application of the saddle is for supporting a 12 inch outside diameter filament would plastic pipe wherein the cradle has a 6 inch radius for its inner surface 17 to conform to the pipe and embraces a segment of 120° over a length of 13 inches. The cradle portion can be of about one-quarter inch thickness. Such a cradle 12 is arranged with a wear pad 13 4 inches wide extending over the length of the saddle. Where the pipe is to be covered with insulation one and a half inches thick, the wear pad should have an outer dimension height at sides 18 and 19 of that amount in order to maintain section of pipe insulation overlying the cradle free of the support surface 14 engaged by the wear block 13. The resin of the saddle structure depends on the atmospheric and other environmental conditions anticipated. Usually it is a polyester or a vinylester although in certain applications an epoxy can be employed. Glass fiber reinforcement is employed in the saddle either as a cloth or a woven roving 20 and can be augmented with a chopped roving.

Strength in the cradle 12 is achieved by extending a layer of cloth 20 continuously around its arc and across the top of the wear block. Typically, a layer of 24 ounce glass fiber woven roving is laid across the cradle face and a second layer 30 is laid along the outer face of the cradle wings 21 and 22 and the exterior face of the wear block 13. The ends of the wear block can then be finished with glass fiber woven or chopped roving or cloth reinforcement for the resin or merely with resin.

Figure 3:
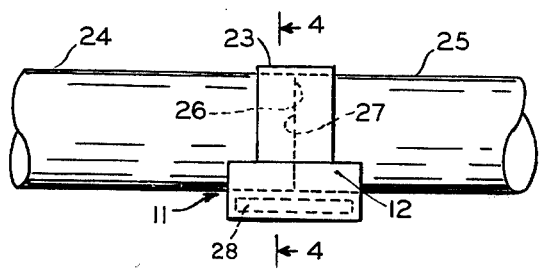
FIG. 3 is a side elevation showing the pipe saddle of this invention employed as a portion of a bonding sleeve for fiber glass reinforced resin pipe at the abutting ends of such pipe.
Figure 4:
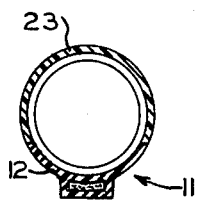
FIG. 4 is a cross-section of FIG. 3 taken along the 4—4.

While the saddles can function as pipe supports by merely laying the pipe in their cradles 12, they can also be used as a portion of a bonding sleeve for glass reinforced pipe as shown in FIGS. 3 and 4. In such instances, a typical coupling is a sleeve 23 of compatible material of right-circular cylindrical form of the same internal diameter as the cradle 12 and having a segment cut-away to accommodate the cradle so that when fitted on the pipe sections 24 and 25, the combination of the sleeve 23 and cradle 12 register with and embrace the entire circumference of the abutted ends 26 and 27 of the respective sections. Where the saddle is a portion of the pipe coupling, a suitable bonding resin is coated over the cradle-pipe interface and the coupling sleeve-pipe interface and the pipe is placed in the cradle. Where butt end joints are employed the ends of the pipe may be also bonded. Alternatively, where bell and spigot joints (not shown) are employed the cradle can be made to accommodate the outer diameter of the bell and the interfacial regions of the cradle and bell bonded.

Figure 2:
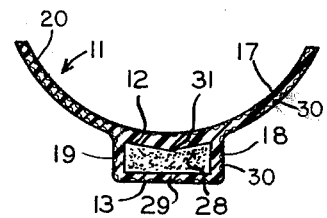
FIG. 2 is a cross-section of FIG. 1 taken along the line 2—2.

Advantageously, wear pad 13 is formed with an insert or core 28. Typically the core 28 can be of polyurethane, foamed to a density of about 2 pounds per cubic foot. This coring reduces the weight of the saddle 11. More significantly it enhances the product and reduces its expense. The core reduces the amount of resin and glass fiber required. In the preferred form core 28 is formed to generally conform to the curve of the cradle so that the glass fiber reinforced resin wall thickness of the structure is uniform or nearly uniform along the cradle in the region adjacent the wear pad 13 and the wall thickness of the wear pad 13, as at sides 18 and 19 and bottom 29 is uniform and of the thickness of the cradle wall. As shown in FIG. 2 the upper surface of core 28 is concave at 31 with either an arc or a V-groove which generally follows the curve of the cradle.

This uniformity of wall thickness reduces the heat of cure of the resin in the exothermic reaction of the cure and permits a more uniform cure whereby distortion of the saddle is reduced or eliminated thereby avoiding concentrations of pressure between the pipe and cradle or the wear block and its support.

Figure 5:
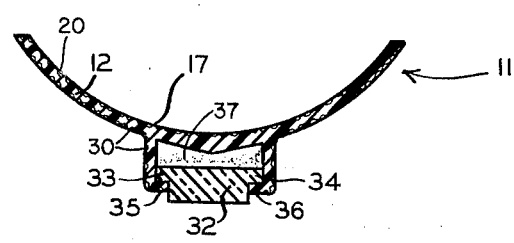
FIG. 5 is a cross-section corresponding to FIG. 2 of a modified form of pipe saddle according to this invention including a low friction support shoe.

It is desirable that movement between the cradle and the pipe section it supports be minimized. Accordingly, the wear block 13 should move with respect to its support 14 as the pipe expands or contracts longitudinally or moves laterally within the limits of permissible motion. While the smooth resin face of the wear block bearing surface provides a high degree of freedom of motion with respect to the support surface 14, an enhanced degree of freedom of motion can be achieved by providing a low friction shoe 32 as the bearing surface. FIG. 5 shows a low friction show 32 of T form having longitudinal side flanges 33 and 34 which are overlapped along the sides by the glass fiber reinforced resin shell of the wear block 13 as at 35 and 36. The ends of the shell can further secure shoe 32 and the overlying core 37 corresponding to core 28 but dimensioned to maintain proper height of the cradle above the support and a proper cradle wall thickness as described above. A convenient material for the bearing surface face of shoe 32 is high molecular weight polyethylene or, where high temperatures are encountered in application of the pipe support, Teflon. Where the shoe wall is relied upon for augmenting the strength of the cradle, the shoe 32 can be shorter than the body of the wear block 13 so that a continuous span of glass fiber reinforced resin shell extends across the bottom of block 13 at its ends.

It is to be appreciated that alternative materials can be utilized and that the form of the cradle including the wear block can be changed in dimensions without departing from the spirit or scope of this invention. Accordingly the detailed description should be read as illustrative and not in a limiting sense.

What is claimed is:

1. A pipe saddle comprising a unitary structure formed of a continuous body of glass fiber reinforced resin including a cradle in the form of a segment of a right-circular cylinder of glass fiber reinforced resin; a wear block having a broad flat bottom surface extending parallel to the cylindrical axis of the cradle over a substantial portion of its length and integral with said cradle; a core of material other than said resin conformed to the external shape of said wear block and contiguous cradle portion; wings of said cradle extending beyond said wear block as portions of said segment of a cylinder wherein said cradle segment includes a continuous layer of woven glass fiber extending around the arc thereof and between the distal portions of said arc to reinforce said wings; and walls of said resin reinforced with glass fiber embracing said core to define said wear block, said walls cooperating with said core to form a resin and glass fiber thickness which is essentially uniform around said core and throughout said wings.

2. A pipe saddle according to claim 1 wherein said core has a concave surface adjacent said cradle to conform generally to the arc of said cradle.

3. A pipe saddle comprising a unitary structure formed of a continuous body of glass reinforced resin including a cradle in the form of a segment of a right-circular cylinder of a glass fiber reinforced resin; a wear block having a broad flat bottom surface extending parallel to the cylindrical axis of said cradle over a substantial portion of its length and integral with said cradle; a core of material other than said resin conforming to the external shape of said wear block and contiguous cradle portion; walls of said resin reinforced with glass fiber embracing said core to define said wear block said walls cooperating with said core to form a resin and glass fiber thickness which is essentially uniform over said segment and around said core; and a shoe of material having a low coefficient of friction with respect to the surface upon which it is adapted to be mounted embraced by said walls of said unitary structure and secured to said wear block and protruding from said bottom surface thereof, said shoe having a bearing surface extending along a substantial length of said wear block and exposed on the mounting face of said wear block to engage the surface upon which it is adapted to be mounted.

4. A pipe saddle according to claim 3 wherein said shoe has side flanges extending beyond the longitudinal sides thereof; and wherein said wear block includes side walls extending outward of said cradle and around said shoe flanges formed of glass fiber reinforced resin.

5. A pipe saddle according to claim 3 wherein said shoe is of high molecular weight polyethylene.

6. A pipe saddle according to claim 3 wherein said cradle is of a length at least as great as the diameter of the pipe to be supported thereby and wherein said wear block is centered on the arc of a cross-section of said cradle segment of a cylinder.

* * * * *